L. Wertz,

Water Wheel;

№ 123, Reissued Aug. 15, 1848.

N. PETERS, PHOTO-LITHOGRAPHER, WASHINGTON, D. C.

UNITED STATES PATENT OFFICE.

LEWIS WERTZ, OF CHAMBERSBURG, PENNSYLVANIA.

IMPROVEMENT IN WATER-WHEELS.

Specification forming part of Letters Patent No. 5,637, dated June 20, 1848; Reissue No. 123, dated August 15, 1848.

*To all whom it may concern:*

Be it known that I, LEWIS WERTZ, of Chambersburg, in the county of Franklin and State of Pennsylvania, have invented certain new and useful Improvements in Water-Wheels, of which the following is a full, clear, and exact description, reference being had to the annexed drawings of the same, making part of this specification, in which—

Figure 3:
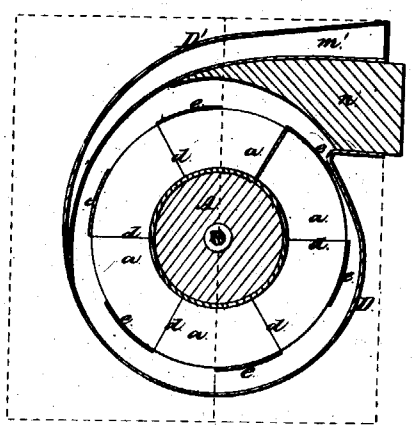
Figure 4:
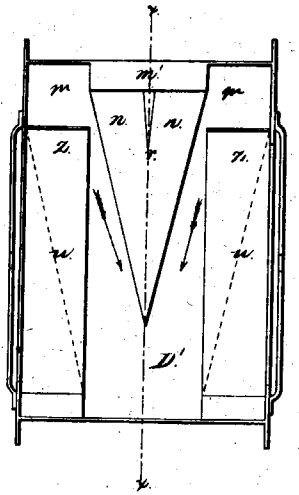
Figure 1:
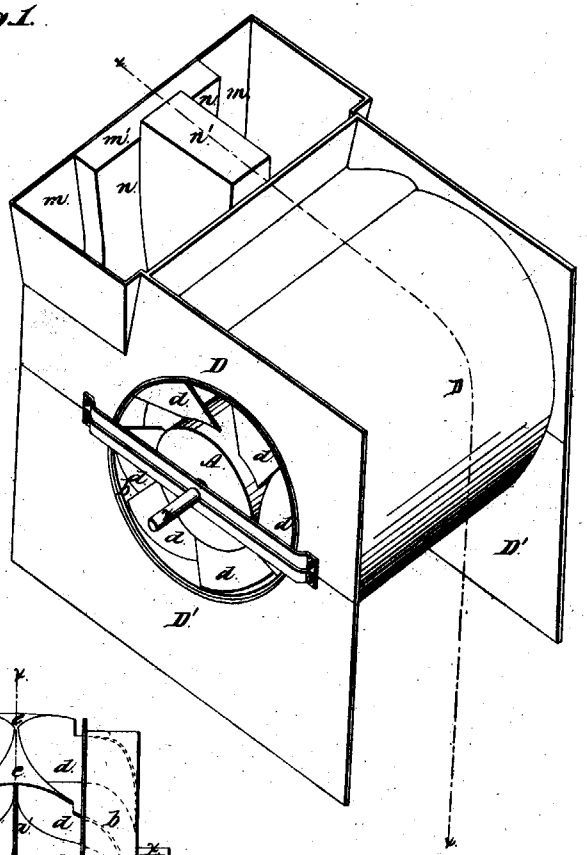
Figure 2:
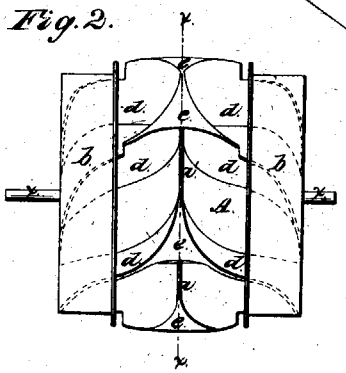

Figure 1 is a perspective view of the wheel, chute, and casing, all combined, showing the wheel ready for action. Fig. 2 is a side view of the wheel detached from the chute and casing. Fig. 3 is a section through the line *x x* of Figs. 1, 2, and 4. Fig. 4 is a view of the interior of the under half of the chute and casing.

The same letters indicate the same parts in all the figures.

In the accompanying drawings, A, Figs. 1, 2, and 3, is the cylinder or body of the wheel, upon the surface of which the buckets are arranged. This cylinder is mounted upon a suitable shaft, *x*, which rests on bearings secured to the casing of the wheel or the framework of the penstock. Round the middle of the cylinder a thin radial collar, *a*, projects, which is of the same width as the buckets. The rims *b b* on the ends of the wheel bind the outer ends of the buckets firmly to the cylinder, and bound the outside of the aperture or chutes, through which the water is discharged from the wheel. The buckets *d* are arranged in pairs (see Fig. 2) round the cylinder, each pair being secured at their inner ends to a common point on the collar *a*, whence they diverge in curved lines toward the ends of the wheel. The angle between the inner end of the buckets and the collar is covered by a cap, *e*, to form a pocket or recess, into which the water is directed from the chutes, the cap preventing it from dashing out laterally, and constraining it to form a regular and dense current, which passes off quietly and steadily through the discharge-aperture. In this way the water acts in a solid compact body, and produces a much greater effect than when broken up into a number of small conflicting currents, as it would be but for the caps *e*.

The casing, which also forms the scroll or chute to conduct the water from the penstock to supply the wheel, is divided into two parts—the upper, D, and the lower, D′. The water enters the wheel by two distinct chutes, which approach each other obliquely from opposite ends of the wheel, and are separated by the wedge-shaped pieces *m′ n′*. Each of these chutes is subdivided into a principal channel or chute, *n*, and an auxiliary chute, *m*. The projecting part *m′* of the back of the casing or scroll forms the back of the chutes *n*, and the sides of the dividing-piece *n′* and the sides of the casing D D′ form its sides, its front being open to the wheel. These chutes meet at the point *r*, converging the water upon the middle of the wheel. The auxiliary chutes *m m* are formed outside and behind the chutes *n n* by depressions in the casing or scroll, being separated from each other by the wedge-shaped projection *m′*, the sides of which form the inner sides of the chutes. The outsides of the chutes are represented by the dotted lines *u u*, Fig. 4. The front of these chutes is separated from that part of the wheel which is outside of the buckets by the curved plates *z z*, beneath which the water approaches the wheel in a direction (indicated by the arrows, Fig. 4,) oblique both to its axis and to the plane of its motion. The water which passes through the auxiliary chutes enters the wheel on the opposite side, or one hundred and eighty degrees from the point at which the water from the principal chutes enters it. The convergence of the water in this manner toward the middle of the wheel directs it perpendicularly into the angles at the inner ends of the buckets, and also counteracts the tendency which the effluent current has to draw it through the discharge-apertures before it has acted directly against the buckets.

To mount the wheel upon a vertical shaft in such a manner that it would act with the greatest efficiency would require a slight modification in the arrangement of the parts. It should be made with but one series of buckets, and of only one-half of the length of the double wheel represented in the accompanying drawings, a strong disk being made to replace the central collar, *a*, which in this arrangement would form the upper end of the wheel. The end of the buckets opposite to the issues would be secured to the disk, which itself would be firmly fastened upon the shaft. Any number of chutes may be arranged for supplying water to the wheel that the circumstances of the case may require.

What I claim as my invention, and desire to secure by Letters Patent, is—

1. The combination of the cap *e* with the inner ends of the converging buckets *d* and the collar *a* for the purpose of forming a pocket or channel to prevent the water from spreading out laterally when it first acts against the wheel, and keeping it in a solid compact current until finally discharged, whereby an increased amount of useful effect is obtained from it, as herein set forth.

2. The combination of auxiliary converging chutes with the principal chutes and the wheel, the same being constructed and arranged substantially as herein described.

In testimony whereof I have hereunto signed my name in presence of two witnesses.

LEWIS WERTZ.

Witnesses:
JOHN M. RADEBAUGH,
JACOB GLOPER.